Feb. 28, 1950  G. T. HEMMETER  2,499,219
TWO-SPEED DRIVE MECHANISM
Filed Feb. 27, 1947  2 Sheets-Sheet 1

*INVENTOR.*
GEORGE T. HEMMETER
BY
W. G. Sullivan
ATTORNEY

Feb. 28, 1950     G. T. HEMMETER     2,499,219
TWO-SPEED DRIVE MECHANISM

Filed Feb. 27, 1947     2 Sheets-Sheet 2

INVENTOR.
GEORGE T. HEMMETER
BY
W. G. Sullivan
ATTORNEY

Patented Feb. 28, 1950

2,499,219

UNITED STATES PATENT OFFICE 2,499,219

TWO-SPEED DRIVE MECHANISM

George T. Hemmeter, Berkeley, Calif.

Application February 27, 1947, Serial No. 731,327

4 Claims. (Cl. 192—4)

This invention relates to a two-speed drive mechanism and more particularly to a mechanism of this type adapted to selectively drive either one or two shafts whereby one shaft may be driven at a given speed and upon speed change both shafts may be concurrently driven at the same reduced speed.

The mechanism may also include a brake whereby one shaft may be held against rotation while its associated shaft is rotated. The driven shaft is actuated by a split V drive pulley, driven preferably through a V belt from a motor or other suitable power source. Upon increasing the V belt total tension, which may be effected either by motor movement or through use of an idler pulley, the effective belt pitch diameter at the split pulley is reduced and its axial movement drivingly engages a suitable clutch thus locking both shafts and concurrent rotation is allowed, since the brake is concurrently released. The mechanism has general application but is particularly adapted to a washing machine of the general type illustrated in the co-pending application of James B. Kirby, Serial Number 619,849, filed October 2, 1945.

It is a primary object of my invention to provide an improved two-speed drive mechanism.

Another object of the invention is to provide a two-speed drive mechanism adapted to selectively drive one or both of two coaxial shafts.

Another object of the invention is to provide a two-speed drive mechanism including brake means whereby one of two coaxially disposed shafts may be initially driven at a predetermined speed while the other shaft is held against rotation and thereafter both shafts may be concurrently driven at a different predetermined speed.

Another object of the invention is to provide an improved two-speed drive and clutch mechanism whereby speed change may be effected by change in total belt tension.

Other objects of the invention and the invention itself will be more fully understood from a consideration of the following description and drawings wherein.

Figure 1:
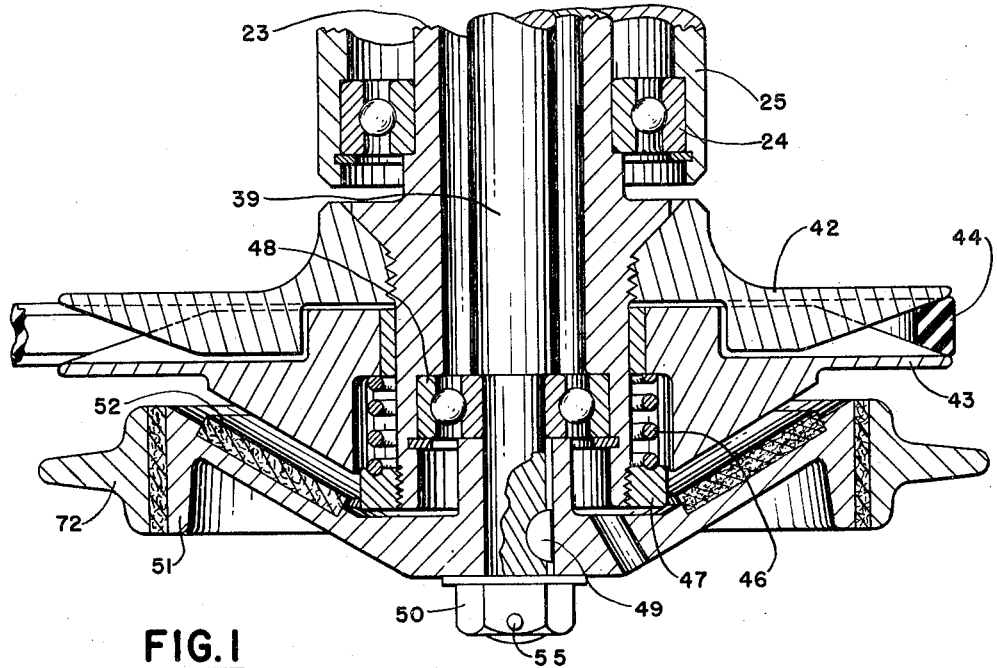
Figure 1 is an enlarged fragmentary sectional view of my two-speed drive mechanism positioned to drive one of two coaxial shafts and to support and prevent rotation of the other of said shafts.
Figure 2:
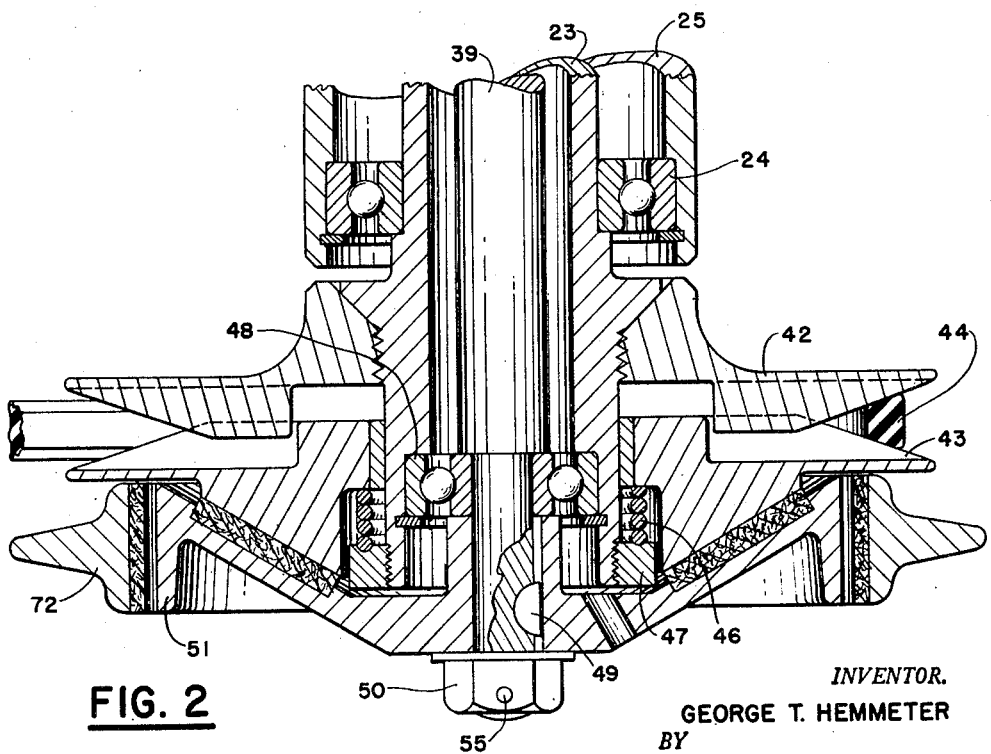
Figure 2 is a view similar to Fig. 1, wherein the mechanism is positioned to concurrently drive two shafts.

Referring now to the drawings, and particularly Figs. 1 and 2, I have indicated at 23 a tubular shaft which is adapted to be driven at a predetermined speed and at 39 a solid shaft coaxial with shaft 23 and which may be concurrently driven with shaft 23 at a different predetermined speed. A split pulley generally indicated at 45 comprises an upper section 42 fixed to tubular shaft 23 and a mating lower articulated section 43 slidable axially along shaft 23. A compression spring 46 is housed in a recess provided in pulley section 43 with its upper convolution bearing against said section and its lower convolution engaging a collar nut 47 threaded to the lower end of shaft 23.

Shaft 23 may be rotatably supported in a suitable manner, preferably by two spaced bearings 24 one of which is shown mounted in a fixed support 25. Shaft 39 may be rotatably supported within shaft 23 as by spaced bearings 48, only one of which is shown. A clutch and brake member 51 is secured to the lower end of shaft 39 in any desired manner as by providing a key system as indicated at 49 and a nut 50 and locking pin 55. The upper surface of member 51 is frusto-conical and lined with a mating conical clutch facing 52 adapted to engage the lower and correspondingly frusto-conical face of pulley section 43. A conventional brake band 72 is adapted to engage member 51 and hold this member and shaft 39 against rotation when desired.

Figure 1 shows the mechanism so far described in a position to drive shaft 23 at a predetermined speed and to hold shaft 39 against rotation. The pulley is driven by a V belt 44 and upon an increase in total belt tension sufficient to overcome the resistance of spring 46, the lower articulated mating pulley section 43 will be moved downwardly to the position, illustrated in Fig. 2 to engage clutch facing 52, whereupon, both shafts 23 and 39 may be locked together and concurrently driven. Inasmuch as the effective pitch diameter of the split pulley is reduced with the parts in the position of Fig. 2, the locked together shafts will be concurrently driven at a higher speed than the speed of shaft 23 when driven alone. In a manner to be explained, the brake band 72 will be disengaged from member 51 concurrently with coupling of the split pulley to shaft 39.

Figure 3:
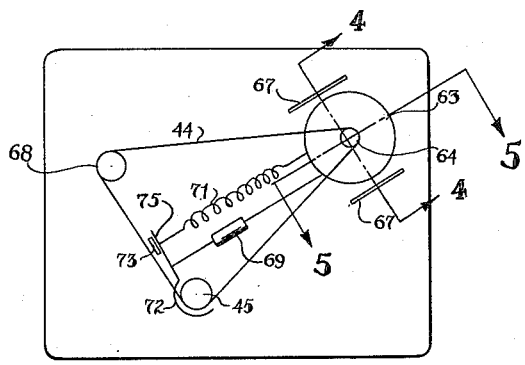
Figure 3 is a plan diagrammatic view showing means by which speed change and dual shaft drive may be effected.
Figure 4:
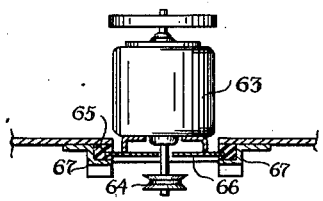
Figure 4 is a section taken along the line 4—4 of Fig. 3.

The method of effecting speed change will now be described. In Fig. 3, driving motor 63 has a drive pulley 64 which, through V belt 44, drives the split pulley generally indicated at 45 and a second pulley 68 which may be an idler pulley or operate a power take off for a pump or the like. Motor 63 is mounted to move along sloping guide-ways 67, the guide-ways may comprise Z section strips welded or otherwise secured to a supporting plate and rubber strips 65 clamped between the plate and guide-ways are grooved to receive a generally rectangular plate 66 which supports the motor 63. The slope of the ways is roughly equal to half the included angle subtended between the V grooves of the pulley driving faces. If desired the plate receiving grooves in strips 65 may include metal liners of U cross section for engaging plate 66. A Sylphon piston 69 is mechanically connected to motor 63, whereby, when the piston plunger is extended in a conventional manner, it will slide motor 63 generally to the right as viewed in Fig. 3, thereby increasing the total tension on belt 44 at some predetermined rate. A tension spring 71 has one end fixed to the motor 63 and its other end secured to a brake arm 75 whereby when the piston plunger is withdrawn the spring 71 will move motor 63 generally to the left as viewed in Fig. 3 and set the brake 72 so as to prevent rotation of brake member 51. Suitable stops as indicated at 73 may be provided to determine the extreme leftward travel of brake arm 75 and the right or left positions of the motor. Brake 72 adapted to engage the clutch member 51 is also operable by Sylphon piston 69 whereby when the Sylphon piston is extended to increase the tension on belt 44, the brake will be disengaged by forcing arm 75 against its stop 73.

Figure 5:
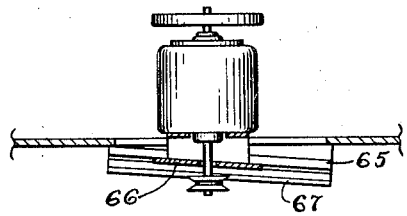
Figure 5 is a section taken along line 5—5 of Fig. 3.

It will be noted by reference to Figs. 1 and 2 that the belt position at the split pulley is lowered when the belt tension is increased to couple the split pulley with clutch member 51. To correspondingly drop the motor drive pulley 64, the guide-ways 67 are slightly inclined. Also, plate 66 is inclined downwardly at an angle equal approximately to half the subtended angle, as shown in Fig. 5, between the pulley driving faces so as to preserve belt alignment during operation. The same result could be achieved by having the motor pivotally mounted so as to swing downwardly at the approximate angle specified above so that the motor drops as it is moved away from the driven pulley. Thus, in either of the split pulley positions illustrated in Figs. 1 and 2, the split articulated pulley 45 and the driving pulley 64 are in a common plane at right angles to the axes of the pulleys. The pulley 68 is mounted in any wellknown manner, as, for example, on a splined shaft, so that it is self-adjusting or movable axially of its axis so that it will conform to either belt position illustrated in Figs. 1 and 2.

Assuming the parts of the mechanism to be as illustrated in Fig. 1, wherein the motor 63 is in its extreme left position (Fig. 3), the split pulley 45 will rotate tubular shaft 23 and at the same time solid shaft 39 will be held against rotation due to the brake 72 engaging clutch member 51. When it is desired to concurrently drive both shafts, the belt tension is increased by motor movement as previously explained, to move pulley part 43 into clutching engagement with clutch member 51 so that the parts of the drive mechanism will occupy the position illustrated in Fig. 2. Shafts 23 and 39 will then both be driven at the same speed and at an increased speed relative to the initial speed of shaft 23.

The drive mechanism is particularly adapted to washing machines or the like which are automatically controlled by means of a conventional electric timer system, but it is understood that motor movement or belt tension may be manually controlled to effect speed change if desired. Also, the belt tension could be varied in other ways such as by movement of pulley 68 rather than the motor. It should be noted that the rate of transition from the single shaft drive condition to the dual shaft drive at increased speeds can be controlled by controlling the rate of application of energy to the Sylphon plunger 69.

I wish it to be understood that I do not desire to be limited to the exact details of construction shown and described, for obvious modifications will occur to a person skilled in the art.

What I claim is:

1. A two-speed drive and brake mechanism comprising a pair of relatively rotatable coaxial shafts, a belt-driven split pulley, one part of the split pulley being fixed to one of said shafts and the other part being movable axially of said shaft, a clutch member fixed to the other of said shafts and engageable with the said other split pulley part, brake means engageable with the clutch member, means yieldingly resisting movement of said other pulley part toward the clutch member whereby at a given belt tension the said one shaft will be rotated at a predetermined speed and the said other shaft will be braked against rotation, and means for concurrently disengaging the brake means and engaging the said other pulley part with the clutch member whereby both shafts may be concurrently driven at a speed higher than said predetermined speed.

2. A two-speed drive and brake mechanism comprising a first shaft, a second shaft rotatably mounted relative to the first shaft and coaxial therewith, a belt-driven split pulley, one part of the split pulley being fixed to the first shaft and the other part being movable axially of the first shaft, a clutch member fixed to the second shaft and engageable with the other split pulley part, brake means engageable with the clutch member, means yieldingly resisting movement of the said other pulley part toward the clutch member whereby at a given belt tension the said other pulley part will be engaged with the clutch member to drive both shafts at a predetermined speed, and means for concurrently reducing the belt tension to disengage the clutch member from said other pulley part and engaging the brake means with said other pulley part whereby only the first shaft may be driven at a reduced speed.

3. A two-speed drive and brake mechanism comprising a first tubular shaft, a second coaxial shaft rotatably mounted within the first shaft, a belt-driven split pulley, one part of the split pulley being fixed to the first shaft and the other part being axially movable therealong, a clutch member fixed to the second shaft and engageable with the said other split pulley part, brake means engageable with the clutch member, means yieldably resisting movement of the said other pulley part toward the clutch member whereby at a given belt tension the first shaft will be rotated at a predetermined speed and the second shaft will be braked against rotation, and means for concurrently disengaging the brake means and engaging the said other pulley part with the clutch member whereby both shafts may be concurrently driven at a speed higher than said predetermined speed.

4. The two-speed drive and brake mechanism as described in claim 2 and wherein the means for concurrently reducing belt tension and engaging the brake means is automatically operable.

GEORGE T. HEMMETER.

REFERENCES CITED

The following references are of record in the file of this patent:

UNITED STATES PATENTS

| Number | Name | Date |
|---|---|---|
| 1,274,891 | Jones | Aug. 6, 1918 |
| 1,460,622 | Thompson | July 3, 1923 |
| 1,913,226 | Adams | June 6, 1933 |
| 2,191,200 | Heyer | Feb. 20, 1940 |
| 2,215,831 | Heyer | Sept. 24, 1940 |
| 2,254,592 | Berkeley | Sept. 2, 1941 |
| 2,283,267 | Kohl | May 19, 1942 |
| 2,311,993 | Olsen | Feb. 23, 1943 |

FOREIGN PATENTS

| Number | Country | Date |
|---|---|---|
| 298,741 | Germany | Apr. 7, 1915 |
| 535,116 | Germany | Oct. 6, 1931 |